United States Patent [19]
Mauritz

[11] 3,801,145
[45] Apr. 2, 1974

[54] DOOR LOCKING APPARATUS

[76] Inventor: Frank A. Mauritz, P.O. Box 9133, Fort Lauderdale, Fla. 33310

[22] Filed: Aug. 1, 1972

[21] Appl. No.: 276,958

[52] U.S. Cl.................... 292/184, 49/56, 214/58, 220/41, 296/155, 105/378, 105/311 R
[51] Int. Cl..................... B61d 19/00, E05b 65/20
[58] Field of Search .......... 105/308, 309, 310, 311, 105/370, 395; 109/24, 25; 70/91; 220/41; 49/94, 50, 57, 234, 235; 296/155; 214/58, 63; 292/184

[56] References Cited
UNITED STATES PATENTS
| | | | |
|---|---|---|---|
| 1,133,953 | 3/1915 | Gordon | 105/395 |
| 1,165,581 | 12/1915 | Evans | 105/395 |
| 1,211,990 | 1/1917 | Williams, Jr. | 105/305 |
| 1,666,775 | 4/1928 | Craig et al. | 105/395 |
| 3,295,704 | 1/1967 | Gillick et al. | 214/58 |

*Primary Examiner*—Robert G. Sheridan
*Assistant Examiner*—Richard A. Bertsch
*Attorney, Agent, or Firm*—Oltman and Flynn

[57] ABSTRACT

Apparatus for locking a door of a vehicle including a U-shaped spring mounted on the vehicle to receive and embrace the vehicle, the spring having one position in which it clamps the door of the vehicle in a locked condition and another position in which it is released from the door so that the door can be opened. The spring is movable and rides on guides between the lock position and the release position. Electromagnets are provided for pulling the spring to release it so that it can be moved from the lock position to the release position.

7 Claims, 5 Drawing Figures

FIG. 2
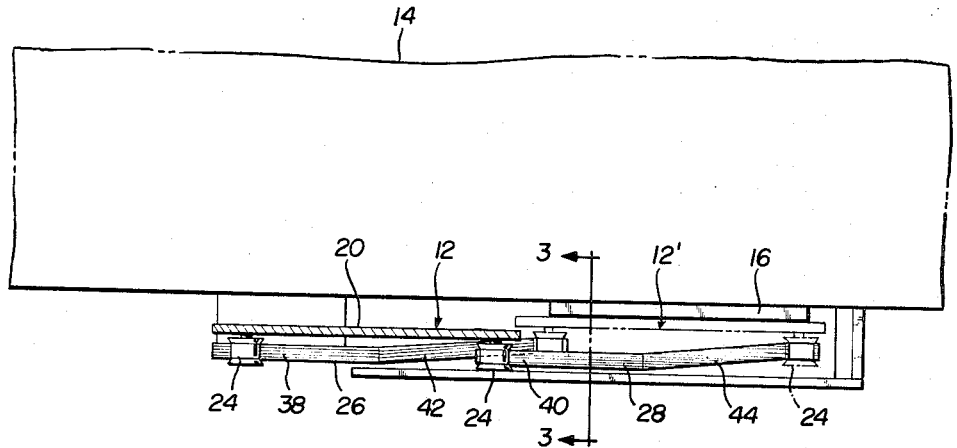
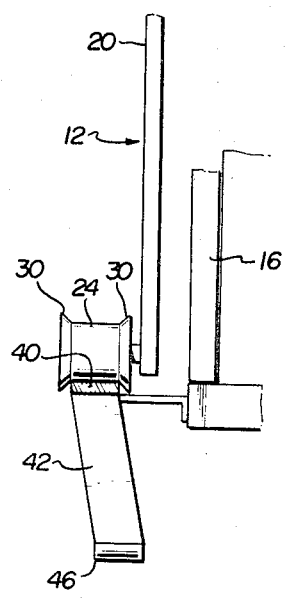
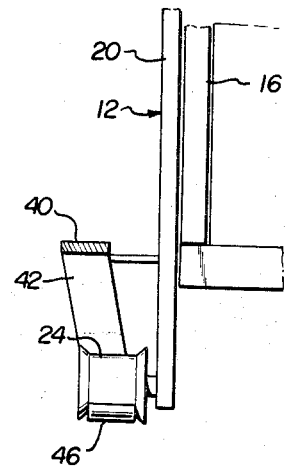
FIG. 3
FIG. 4

DOOR LOCKING APPARATUS

BACKGROUND OF THE INVENTION

Common carriers are plagued by burglaries in which freight is stolen from vehicles. This problem is of particular concern to railroads and truckers. Sometimes railroad cars and trucks are burglarized by breaking or picking a lock provided on a door of the vehicle. There has been a need for a safety lock for such doors which cannot readily be broken or picked.

SUMMARY OF THE INVENTION

The present invention provides apparatus for locking a door of a vehicle including a U-shaped spring which embraces the vehicle and clamps a door of the vehicle in a locked condition. In a preferred embodiment, the spring has an inverted U-shaped in which the vehicle is received such that arms of the spring straddle the vehicle. Guiding tracks may be mounted on lower portions of the vehicle, either inside or outside the spring, and the spring may have wheels which ride along these tracks between a lock position in which the door is clamped in a locked condition and a release position in which the door can be opened. Electromagnets are provided for pulling on the arms of the spring to release them so that the spring can be relatively moved from the lock position to the release position.

Accordingly, it is an object of the present invention to provide improved door locking apparatus for vehicles.

Another object of the invention is to provide apparatus for locking a door of a vehicle which can only be opened with very specialized equipment.

A further object of the invention is to shield and lock doors of a vehicle with a spring which substantially covers the doors of the vehicle.

Another object of the invention is to release the spring lock by means of an electromagnet.

A further object of the invention is to embrace opposed doors of a vehicle with a U-shaped spring which clamps both doors in a locked position.

Other objects of this invention will appear from the following description and appended claims, reference being had to the accompanying drawings forming a part of this specification wherein like reference characters designate corresponding parts in the several views.

BRIEF DESCRIPTION OF THE DRAWINGS

FIG. 2 is a fragmentary plan view showing the door locking apparatus;

FIG. 3 is a sectional view of the door locking apparatus taken along line 3—3 of FIG. 2 and locking in the direction of the arrows;

FIG. 4 is a view similar to FIG. 3 but with a spring of the apparatus in a changed position; and FIG. 5 is an elevational view showing the railroad car of FIG. 1 in conjunction with electromagnets for releasing the spring lock.

Figure 1:
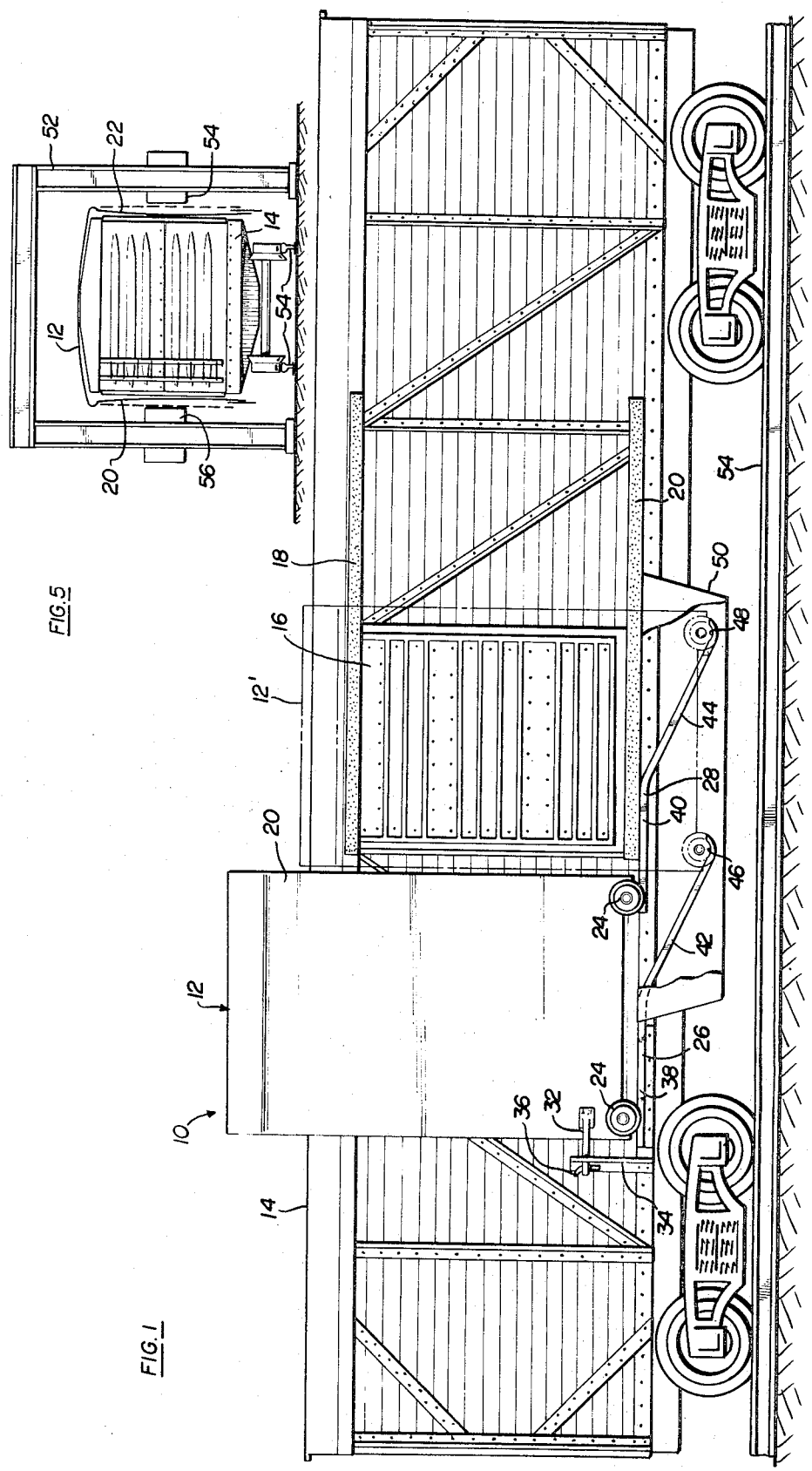
FIG. 1 is an elevational view of a railroad car provided with a door locking apparatus in accordance with one embodiment of the invention.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

DETAILED DESCRIPTION

The door locking apparatus 10 includes a U-shaped spring 12 mounted on a vehicle 14 which in this embodiment is a railroad freight car. The freight car 14 has a door 16 which is slidable along rails 18 and 20. A spring 12 is a metal member of magnetic material having an inverted U-shape as shown in FIG. 5. The arms 20 and 22 of the spring receive and embrace the freight car 14 and are self-biased inwardly toward the sides of the freight car so that the spring normally will clamp against the door 16 to lock that door when the spring is in the dashed line position shown at 12' in FIG. 1. The dashed line position at 12' is the lock position of the spring, and the solid line position 12 is the release position.

The spring 12 has wheels 24 at its bottom edges on both sides of the freight car. The wheels and tracks may be either inside or outside of the spring. The wheels 24 ride on tracks 26 and 28 which may be seen on one side of the car in FIG. 1 and which are duplicated on the opposite side of the car. The wheels 24 may have flanges 30 as shown for example in FIG. 3 so that they will not slip off the tracks.

The spring 12 may be retained in the release position by an arm 32 received in a bracket 34 and fastened by a pin 36. The pin 36 is removed to allow the spring 12 to be moved to the lock position 12'.

The tracks 26 and 28 have horizontal portions 38 and 40 and slanting portions 42 and 44 which slant from portions 38 and 40 both downwardly and inwardly toward the car. The slanting portions 42 and 44 define wells at 46 and 48 which receive the wheels 24 when the spring is in the lock position 12'.

The slanting portions 42 and 44 of the tracks are within an enclosure 50 which blocks access to the wheels 24 so that they cannot be removed from the tracks in the lock position.

In FIG. 3, the front wheel 24 is shown on the horizontal portion 40 of track 28. In this position, the arm 20 of spring 12 is released from the door 16.

In FIG. 4, the rear wheel 24 is shown in the well 46 of the downwardly slanting portion 42 of track 26. It may be seen that in this position the arm 20 of spring 12 clamps against the door 16 to lock the door 16. The spring clamps the door 16 with a great deal of force so that it cannot be easily opened. The arm 20 of the spring substantially covers the door 16 in the lock position to shield the door so that it cannot be tampered with.

The spring 12 is released in the manner shown in FIG. 5. The freight car 14 is placed within a bridge 52 which straddles the railroad tracks 54. Mounted on the bridge 52 are vertically movable electromagnets 54 and 56. The arms 20 and 22 of the spring 12 are lined up with the electromagnets. When the electromagnets are actuated, they pull the arms 20 and 22 away from the doors of the freight car. The freight car is then moved so that the spring 12 shifts from the lock position to the release position. The electromagnets move vertically as the spring shifts. Alternatively, the bridge 52 could be movable to shift the spring. In either case, there is relative movement between the spring and the freight car to shift the spring from the lock position to the release position.

Thus, the invention provides a relatively secure locking apparatus for locking the door of a vehicle. A vehicle other than a freight car may be protected. For example, a truck may be embraced with a spring in the manner described above to lock a side door of the truck. The spring could also protect a rear door of the truck. The spring clamps a door of the vehicle with such great force that only special equipment such as the electromagnet described herein can open or release the spring.

Having thus described my invention, I claim:

1. Apparatus for locking a door of a vehicle comprising:
   a U-shaped spring receiving and embracing the vehicle,
   said spring having a first position over a door of the vehicle in which said spring clamps against the door to lock the same,
   said spring being releasable from said door and relatively movable to a second position on said vehicle adjacent said door, and
   guide means for guiding the movement of said spring relative to said vehicle.

2. The apparatus as claimed in claim 1 in which said guide means comprises tracks.

3. The apparatus as claimed in claim 2 in which said spring has an inverted U-shape and has wheels at the bottom thereof riding on said tracks.

4. The apparatus as claimed in claim 3 in which said tracks have horizontal portions at said second position for said spring and downwardly slanting portions at said first position defining wells into which said wheels ride when said spring is placed over said door.

5. The apparatus as claimed in claim 4 in which said downwardly slanting portions also slant inwardly toward said vehicle.

6. The apparatus as claimed in claim 5 including an enclosure about said downwardly slanting track portions.

7. Apparatus for locking and unlocking a door of a vehicle comprising:
   a spring having an inverted U-shape receiving and embracing the vehicle and having wheels at the bottom thereof,
   guiding tracks mounted at the lower portion of the vehicle on which said wheels ride,
   said tracks having horizontal portions and slanting well portions,
   said spring having a first position at said well portions in which said spring clamps said door to lock the same, and having a second position at said horizontal track portions adjacent to said door, and said spring being movable between said first and second positions, and
   electromagnet means to pull said spring outwardly from said door to release the same for relative movement from said first position to said second position to make the door accessible.

* * * * *